United States Patent
Bradshaw et al.

(10) Patent No.: US 12,541,403 B2
(45) Date of Patent: *Feb. 3, 2026

(54) RESOURCE ALLOCATION FOR COMPUTER PROCESSING

(71) Applicant: Google LLC, Mountain View, CA (US)

(72) Inventors: Robert Bradshaw, Seattle, WA (US); Rafael de Jesús Fernández Moctezuma, Kirkland, WA (US); Daniel Mills, Mountain View, CA (US); Samuel Green McVeety, Seattle, WA (US); Samuel Carl Whittle, Seattle, WA (US); Andrei Maksimenka, Sammamish, WA (US); Cosmin Ionel Arad, Mountain View, CA (US); Mark Brian Shields, Seattle, WA (US); Harris Samuel Nover, Mountain View, CA (US); Manuel Alfred Fahndrich, Seattle, WA (US); Jeffrey Paul Gardner, Seattle, WA (US); Mikhail Shmulyan, Seattle, WA (US); Reuven Lax, Seattle, WA (US); Ahmet Altay, Mountain View, CA (US); Craig D. Chambers, Seattle, WA (US)

(73) Assignee: Google LLC, Mountain View, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/781,467

(22) Filed: Feb. 4, 2020

(65) Prior Publication Data

US 2020/0225991 A1 Jul. 16, 2020

Related U.S. Application Data

(63) Continuation of application No. 15/395,225, filed on Dec. 30, 2016, now Pat. No. 10,558,501.

(Continued)

(51) Int. Cl.
*G06F 9/50* (2006.01)
*H04L 67/10* (2022.01)
*H04L 67/1097* (2022.01)

(52) U.S. Cl.
CPC .......... *G06F 9/505* (2013.01); *G06F 9/5011* (2013.01); *G06F 9/5016* (2013.01);
(Continued)

(58) Field of Classification Search
CPC ...... G06F 9/505; G06F 9/5011; G06F 9/5061; G06F 9/5016; G06F 2209/508; H04L 67/10; H04L 67/1097
See application file for complete search history.

(56) References Cited

U.S. PATENT DOCUMENTS 6,591,287 B1 7/2003 More et al.
8,458,720 B2 6/2013 Bansal et al.
(Continued)

FOREIGN PATENT DOCUMENTS

CN 1674485 A 9/2005
CN 101533362 A 9/2009
(Continued)

OTHER PUBLICATIONS

Written Opinion issued in International application No. PCT/US2016067538, dated Feb. 9, 2018, 11pages.
(Continued)

*Primary Examiner* — Lewis A Bullock, Jr.
*Assistant Examiner* — Kevin X Lu
(74) *Attorney, Agent, or Firm* — Lerner David LLP

(57) ABSTRACT

A job that receives as input a data stream is executed. For the job, it is iteratively determined a backlog growth over a first period of time; a backlog volume; and whether to adjust a quantity of processing resources. For each iteration for which the quantity of processing resources allocated to the
(Continued)

job are determined to be adjusted, adjusting the quantity of processing resources allocated to the job. For each iteration for which the quantity of processing resources allocated to the job are determined not to be adjusted, maintaining the quantity of processing resources allocated to the job.

15 Claims, 7 Drawing Sheets

Related U.S. Application Data

(60) Provisional application No. 62/303,827, filed on Mar. 4, 2016.

(52) U.S. Cl.
CPC ...... *G06F 9/5061* (2013.01); *G06F 2209/508* (2013.01); *H04L 67/10* (2013.01); *H04L 67/1097* (2013.01)

(56) References Cited

U.S. PATENT DOCUMENTS

| | | | |
|---|---|---|---|
| 8,799,916 | B2 | 8/2014 | Cherkasova et al. |
| 9,135,064 | B2 * | 9/2015 | Dinker ..................... G06F 9/50 |
| 9,384,031 | B2 * | 7/2016 | Shimogawa ........ G06F 9/45558 |
| 9,396,039 | B1 * | 7/2016 | Arguelles .............. G06F 9/5083 |
| 9,542,107 | B2 | 1/2017 | Brown |
| 10,108,244 | B2 * | 10/2018 | Tsuji ..................... G06F 9/4881 |
| 10,409,647 | B2 * | 9/2019 | Carteri ..................... G06F 9/505 |
| 2007/0130213 | A1 | 6/2007 | Jean-Denis |
| 2011/0022871 | A1 | 1/2011 | Bouvier et al. |
| 2012/0254443 | A1 | 10/2012 | Ueda |
| 2012/0296696 | A1 | 11/2012 | Cantor |
| 2013/0060555 | A1 | 3/2013 | Thomson et al. |
| 2014/0040885 | A1 | 2/2014 | Donahue |
| 2016/0306416 | A1 | 10/2016 | Browne |
| 2016/0378545 | A1 * | 12/2016 | Ho ........................ G06F 9/4812 718/107 |
| 2017/0061364 | A1 * | 3/2017 | Waltz .................. G06F 16/2453 |
| 2017/0339062 | A1 * | 11/2017 | Mayer-Wolf ........... H04L 47/29 |
| 2018/0115498 | A1 | 4/2018 | Sundaram |
| 2019/0028407 | A1 * | 1/2019 | Perumal Vijayan .. H04L 41/147 |

FOREIGN PATENT DOCUMENTS

| | | |
|---|---|---|
| CN | 104023042 A | 9/2014 |
| CN | 104951368 A | 9/2015 |
| JP | 2005173928 A | 6/2005 |
| JP | 2010079908 A | 4/2010 |
| JP | 2011-118525 A | 6/2011 |
| JP | 2011210225 A | 10/2011 |
| JP | 2014149690 A | 8/2014 |
| KR | 20120122136 A | 11/2012 |
| KR | 20150062634 A | 6/2015 |
| WO | 2015165546 A1 | 11/2015 |

OTHER PUBLICATIONS

KR Office Action issued in Korean Application No. 10-2018-7020037, dated Nov. 13, 2018, 7 pages (English translation).
International Preliminary Report on Patentability issued in International Application No. PCT/US2016/067538, dated Jun. 8, 2016, 21 pages.
KR Notice of Allowance in Korean Application No. 10-2018-7020037, dated May 8, 2019, 11 pages.
JP Notice of Reasons for Refusal in Japanese Application No. 2018-536462, dated Aug. 6, 2019, 10 pages (with English translation).
AU Office Action issued in Australian Application No. 2016396079, dated Aug. 14, 2019, 3 pages.
EP Office Action in European Application No. 16826534.6, dated Sep. 2, 2019, 5 pages.
First Examination Report for Indian Patent Applicaton No. 201847025664 dated Dec. 3, 2020. 7 pages.
First Office Action for Chinese Patent Application No. 201680078758.4 dated Mar. 2, 2021. 13 pages.
First Office Action for Japanese Patent Application No. 2019-229115 dated Mar. 9, 2021. 4 pages.
Summons to Attend Oral Proceedings for European Patent Application No. 16826534.6 dated May 4, 2021. 7 pages.
Examination Report No. 1 for Australian Patent Application No. 2020201056 dated Apr. 1, 2021. 6 pages.
Result of Consultation for European Patent Application No. 16826534.6 dated Sep. 13, 2021. 6 pages.
Extended European Search Report for European Patent Applicaton No. 21206839.9 dated Feb. 17, 2022. 11 pages.

* cited by examiner

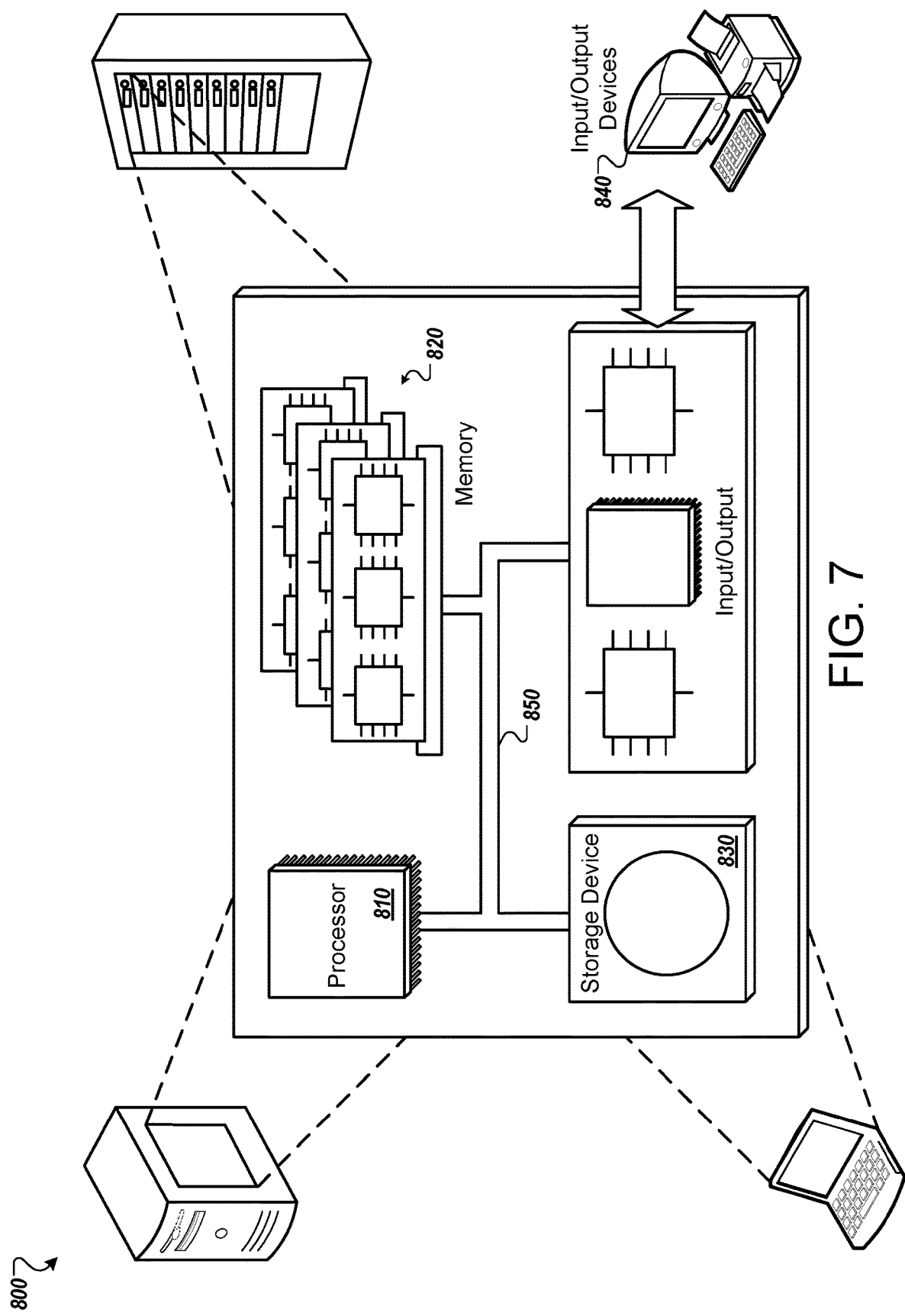

RESOURCE ALLOCATION FOR COMPUTER PROCESSING

CLAIM OF PRIORITY

This application is a continuation of U.S. application Ser. No. 15/395,225, filed Dec. 30, 2016 (now U.S. Pat. No. 10,558,501), which claims the benefit of U.S. Provisional Application Ser. No. 62/303,827, filed on Mar. 4, 2016, the entire contents of each are hereby incorporated by reference.

BACKGROUND

A computer network is a collection of computers and other hardware interconnected by communication channels that allow sharing of resources and information. Communication protocols define the rules and data formats for exchanging information in a computer network.

SUMMARY

The present document relates to computer processing of input in a parallel processing environment.

In one aspect, a method is performed by a computer system. The method includes executing, in a computer system that comprises multiple processing resources, a job that receives as input a data stream, wherein the amount of data in the data stream is unbounded. The method includes iteratively determining, for the job: a backlog growth over a first period of time, wherein the backlog growth is a measure of a growth of unprocessed data in the received data stream that is to be input into the job; a backlog volume that is a measure of unprocessed data in the received data stream that is to be input into the job; and determining, based on the backlog growth and the backlog volume, whether to adjust a quantity of processing resources allocated to the job. The method includes, for each iteration for which the quantity of processing resources allocated to the job are determined to be adjusted, adjusting the quantity of processing resources allocated to the job. The method includes for each iteration for which the quantity of processing resources allocated to the job are determined not to be adjusted, maintaining the quantity of processing resources allocated to the job.

Implementations can include any, all, or none of the following features. For an iteration of the determination: the backlog growth is determined to be zero or negative; the backlog volume is determined to be at a target; determining that the quantity of processing resources allocated to the job are determined not to be adjusted in response to the backlog growth being determined to be zero or negative and the backlog volume determined to be at a target. For an iteration of the determination: the backlog growth is determined to be zero or negative; the backlog volume is determined to be below a target; determining that the quantity of processing resources allocated to the job are determined to be adjusted in response to the backlog growth being determined to be zero or negative and the backlog volume determined to be below a target; and wherein adjusting the quantity of processing resources allocated to the job comprises reducing the quantity of processing resources allocated to the job in response to the backlog growth being determined to be zero or negative and the backlog volume determined to be below a target. For an iteration of the determination the backlog growth is determined to be zero or negative; the backlog volume is determined to be above a target; determining that the quantity of processing resources allocated to the job are determined to be adjusted in response to the backlog growth being determined to be zero or negative and the backlog volume determined to be above a target; and wherein adjusting the quantity of processing resources allocated to the job comprises increasing the quantity of processing resources allocated to the job in response to the backlog growth being determined to be zero or negative and the backlog volume determined to be above a target. For an iteration of the determination: the backlog growth is determined to be positive; the backlog volume is determined to be below a target, determining that the quantity of processing resources allocated to the job are determined not to be adjusted in response to the backlog growth being determined to be positive and the backlog volume determined to be below a target. For an iteration of the determination: the backlog growth is determined to be positive; the backlog volume is determined to be not below a target determining that the quantity of processing resources allocated to the job are determined to be adjusted in response to the backlog growth being determined to be positive and the backlog volume determined to be below a target; and wherein adjusting the quantity of processing resources allocated to the job comprises increasing the quantity of processing resources allocated to the job in response to the backlog growth being determined to be positive and the backlog volume determined to be below a target. The backlog growth is a measure of data size. Units of the data size is at least one of the group consisting of bits, bytes, megabytes, gigabytes, records, and cardinality. Backlog growth is a measure of time to process. Units of the time to process is at least one of the group consisting of microseconds, seconds, minutes, hours, and days. The backlog volume is a measure of data size. Units of the data size is at least one of the group consisting of bits, bytes, megabytes, gigabytes, records, and cardinality. Backlog volume is a measure of time to process. Units of the time to process is at least one of the group consisting of microseconds, seconds, minutes, hours, and days. The method further comprising: iteratively determining, for the job, a processor utilization; wherein iteratively determining whether to adjust a quantity of processing resources allocated to the job is further based on the processor utilization. For an iteration of the determination: the processor utilization is below a value; determining that the quantity of processing resources allocated to the job are determined to be adjusted in response to the processor utilization being determined to be below a value; and wherein adjusting the quantity of processing resources allocated to the job comprises reducing the quantity of processing resources allocated to the job in response to the processor utilization being determined to be below a value. Reducing the quantity of processing resources allocated to the job in response to the processor utilization being determined to be below a value comprises reducing a discrete number of resources allocated to the job, the discrete number being based on the processor utilization. The discrete number is a number of computer memory disks. Determining, based on the backlog growth and the backlog volume, whether to adjust a quantity of processing resources allocated to the job comprises smoothing the determining that results in oscillation of quantity of processing resources allocated to the job. Smoothing the determining comprises waiting for a second period of time. Smoothing the determining comprises averaging a plurality of determinations whether to adjust a quantity of processing resources allocated to the job.

In one aspect, a system comprises one or more processors configured to execute computer program instructions; and computer storage media encoded with computer program instructions that, when executed by one or more processors, cause a computer device to perform operations. The operations include executing, in a computer system that comprises multiple processing resources, a job that receives as input a data stream, wherein the amount of data in the data stream is unbounded. The operations include iteratively determining, for the job: a backlog growth over a first period of time, wherein the backlog growth is a measure of a growth of unprocessed data in the received data stream that is to be input into the job; a backlog volume that is a measure of unprocessed data in the received data stream that is to be input into the job; determining, based on the backlog growth and the backlog volume, whether to adjust a quantity of processing resources allocated to the job. The operations include, for each iteration for which the quantity of processing resources allocated to the job are determined to be adjusted, adjusting the quantity of processing resources allocated to the job. The operations include for each iteration for which the quantity of processing resources allocated to the job are determined not to be adjusted, maintaining the quantity of processing resources allocated to the job.

The systems and processes described here may be used to provide a number of potential advantages. By using backlog measures as a metric to determine resource allocation levels, the drawbacks of overprovisioning and underprovisioning may be reduced or eliminated. Overprovisioning leads to unused or idle network resources, increasing cost and reducing the number of jobs that can be processed. By stepping down resource allocation with workload, unused resources may be freed for different jobs. Underprovisioning leads to increases in backlog, which can result in data loss and increased latency. By stepping up resource allocation with workload, a job can be processed faster when input is increased. In many cases, data is input to a job in a stream or a constant, unbounded flow of data that may increase or decrease unpredictably. Dynamic response to this input, instead of treating it as a batch or planning for worst-case scenarios, allows for flexible responses to large spikes or dips in input.

Other features, aspects and potential advantages will be apparent from the accompanying description and figures.

DESCRIPTION OF DRAWINGS

FIG. 7 is a schematic diagram that shows an example of a computing device.

Like reference symbols in the various drawings indicate like elements

DETAILED DESCRIPTION

In a shared parallel computing environment, computing resources can be allocated to different tasks, both to different parallel execution tasks within a single job, and to different jobs that can be processed concurrently. To determine how those resources should be allocated, the jobs may be assigned a backlog size that defines how much input backlog should be permitted. Resources are then dynamically assigned and removed based on the actual size of the backlog in order to keep the actual backlog at or below the assigned backlog level. This can permit, for example, dynamic allocation of resources matching the needs of a particular job over time.

This dynamic allocation may be referred to as autoscaling. This is because the resources available to a particular job are automatically scaled to match the processing requirement of the input supplied to a job over time. As the volume of input changes over time, more resources are required to prevent an unacceptable build of unprocessed input. This unprocessed input creates a backlog, essentially input that is available to be processed but has not been processed yet.

The backlog can be measured in data size (e.g., bytes, megabytes), time to process (e.g., the duration for which the data is available but has not yet been processed, the expected time until all of the current backlog data is processed using current or a fixed amount of resources, a value of throughput in data over time), a count (e.g., number of files or shards) or along other appropriate dimensions Backlog size is a useful metric use for autotuning because it is a metric that can also impact other computing resources, can affect the usefulness of computer-based products, and can be easily understood by human users. For example, backlogs stored in computer memory will need more and more memory as the backlog increases. By keeping the backlog equal to or smaller than a target size, the amount of memory needed can be known and planned for. Similarly, by keeping the backlog under a target size, quality of service can be provided. A job that parses social media posts may only be useful if it is parsing posts as they are published. By keeping the backlog of unparsed posts under, say, two minutes, the job can be ensured to be useful for its intended purpose. By recording and reporting the backlog in dimensions that are understandable to a human user, those users can make decisions about to use their jobs and how future jobs may be utilized and paid for.

Figure 1:
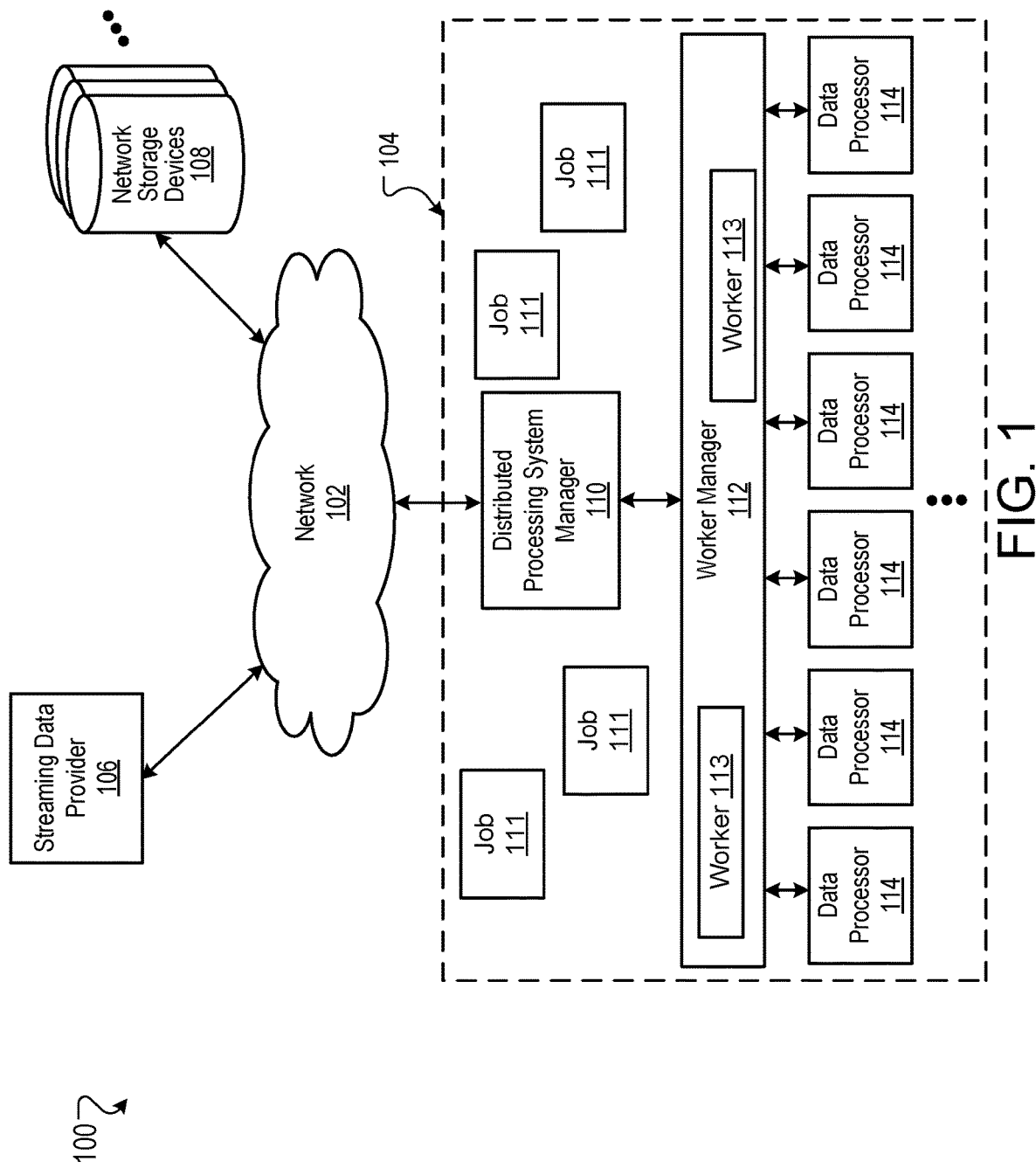
FIG. 1 is block diagram of highly distributed computing environment that autotunes resource allocation to a group of jobs.

FIG. 1 is block diagram of highly distributed computing environment 100 that autotunes resource allocation to a group of jobs. A computer network 102, such as a local area network (LAN), wide area network (WAN), the Internet, or a combination thereof, connects a distributed processing system 104, a streaming data provider 106, and one or more network storage devices 108. The distributed processing system 104 may include, for example, a distributed processing system manager 110, a worker manager 112, and multiple data processors 114. While the network storage devices 108 are depicted separately from the distributed processing system 104, they may also be included in the distributed processing system 104.

The streaming data provider 106 provides data for processing by the distributed processing system 104. The distributed processing system 104 may obtain data records and instructions for performing one or more jobs 111 on the data records. By way of example, the streaming data provider 106 may provide search query records to the distributed processing system 104 for filtering, sorting, and other analysis. Search query records may include, for example, search queries submitted to a search system and related information, such as a timestamp indicating a time that the query was received.

The data from the streaming data provider may be, for example, unbounded, unpredictable, highly variant, and/or bursty. Unbounded data includes data that is a continuously updating data set that does not have a definite size, or streaming data. An example of a continuously updating data set might be server logs as they are generated, or all new orders as they are processed. Unpredictable data includes data that is difficult to predict, cannot be predicted, or has not been predicted, at least in some dimension. For example, the rate of emails a user receives may be unpredictable because it may be dependent on factors that the highly distributed computing environment 100 does not or cannot have access to. Highly variant data includes data that changes significantly in at least one dimension. Highly variant data might be highly seasonal or periodic. Logs from a retailers website may be updated faster or slower, depending on the time of year and shopping season. Bursty data includes data where the instant rate of data generation is rarely close to the mean rate of data generation. Said another way, bursty data is often received by the highly distributed computing environment 100 in bursts of high data reception followed by lulls of low data reception.

The distributed processing system manager 110 may perform process scheduling and resource management services for the data processing system 104, e.g., by assigning jobs 111 to be executed by workers 113, assigning one or more of the data processors 114 to workers 113, assigning one or more disks of the network storage devices 108 to workers 113, identifying and addressing faults and backlogs, and managing temporary and long-term storage. The worker manager 112, while depicted separate from the distributed processing system manager 110, may, in some implementations, be part of the distributed processing system manager 110. The worker manager 112 monitors workers 113, data processors 114, and the networks storage devices 108 to determine if and when workload backlogs are being created. If workload backlogs are being created, or if workload backlogs are not being created while resources (e.g., data processors 114 and/or network storage devices 108) are idle, the workload manager 112 can autotune the resources assigned to jobs 111.

Jobs 111 process data from the streaming data provider 106 and produce output that can be stored to the network storage device 108 or used for other purposes. In some implementations, the jobs 111 receive input data from multiple data streams. For example, a job 11 can receive a stream of social media posts from the streaming data provider 106 and receive a stream of weather data from a different (unshown) streaming data provider. The job 111 can have assigned to it workers 113 in order to process the received streams of input data. Each worker 113 may have assigned, for example, one or more processors 114 and one or more disks, real or virtual, of the network storage devices 108. The workers 113 assigned to a particular job 111 may then process the streaming input data according to processes defined by the jobs 111, and product output to be stored in the network storage devices 108 to be sent elsewhere.

Although this example describes resources (e.g., data processors 114 and network storage devices 108) being assigned to workers 113 and workers 113 assigned to jobs 111, other schemes for allocating resources to jobs 111 are possible. For example, data processors 114 and/or disks of the network storage devices 108 may be assigned directly to the jobs 111 by the distributed processing system manager.

In some cases, the jobs 111 may be decomposed into processes, with each process assigned to one worker 113. This may be advantageous, for example, if the jobs 111 are parallelizable, e.g., able to be decomposed into multiple activates that can be executed independent of each other.

Figure 2:
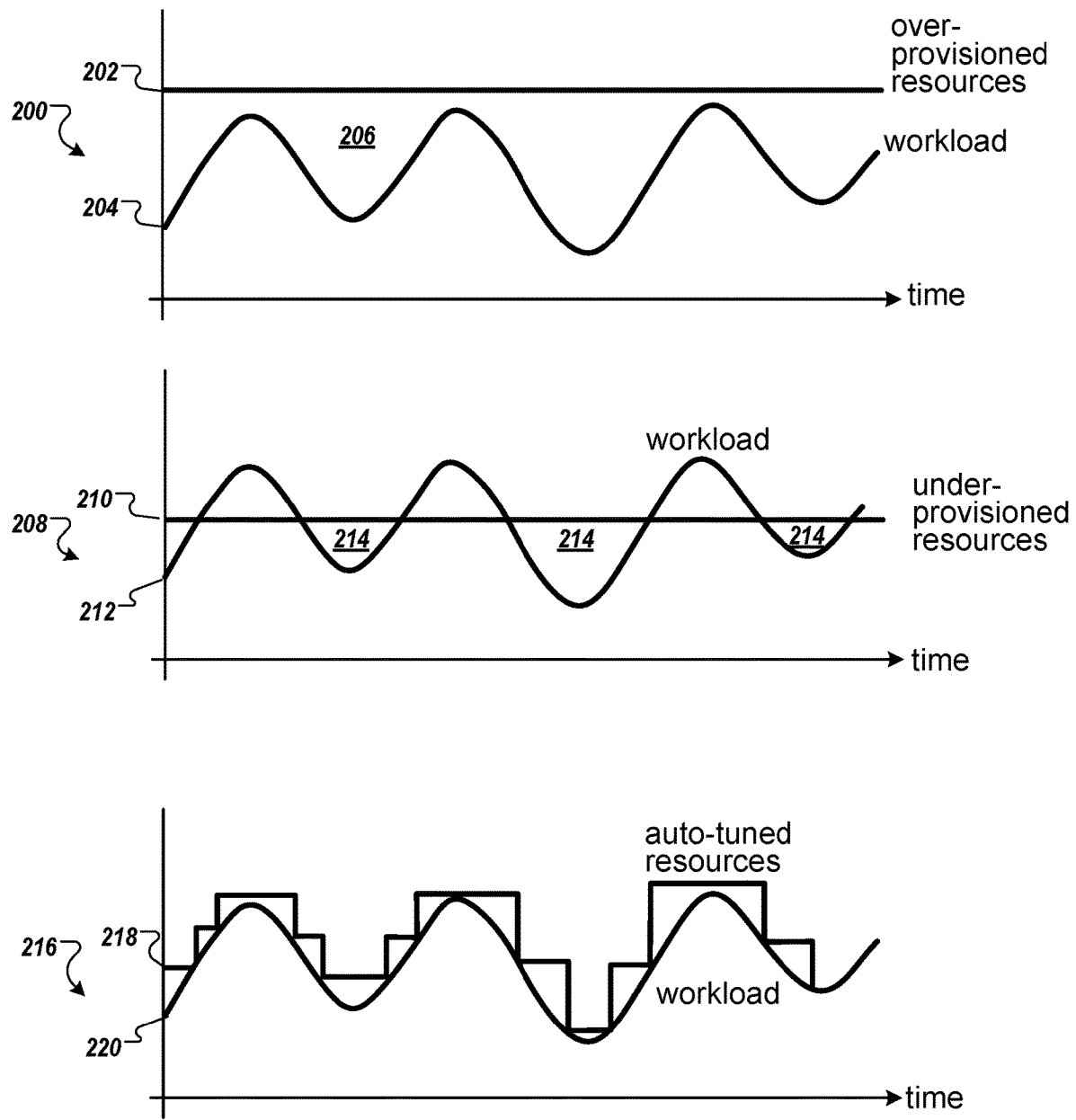
FIG. 2 contains charts showing resource allocation to jobs with and without autotuning.

FIG. 2 contains charts 200, 208, and 216 showing resource allocation to jobs with and without autotuning. Without autotuning, resources can either be overprovisioned or underprovisioned. Overprovisioning can waste resources, while underprovisioning can result in falling behind during spikes in workload. By comparison, autotuning provisioning workers when the workload increases, and similarly reducing the number of workers when workloads decrease, can dynamically adjust resources according to demand.

In chart 200, the over production of resources is shown. Line 202 represents a constant level of provisioning that is greater than the workload, shown in line 204, ever reaches. The area 206 represents the unused, and thus wasted, resources that have been allocated.

In chart 208, the underproduction of resources is shown. The line 210 represents a constant level of provisions that is less than the workload, shown in line 212, during spikes. The areas 214 represent the workload that cannot be processed, resulting in backlog.

In chart 216, autotuned allocation of resources are shown. The line 218 represents a dynamically allocated level of resource allocation that responds to changes in the workload, shown in line 220. As shown, the resources allocated are nearly equal to, or greater, than the workload. Further, while there are some instances where the workload is greater than the allocated resources, which creates increased backlog, the level of resource allocation is quickly increased, resulting in greater resource allocation in the short term. Thus, the increased backlog may be handled by the increased resource allocation and processed to return to the target level.

By way of example, autotuning can use the following signals to make its decisions. CPU utilization: average CPU utilization of all worker VMs in the job. Stage backlog growth: size of unprocessed data. Stage backlog volume: a measure of unprocessed data in the received data stream that is to be input into the job. In some implementations, the backlog volume may be a backlog time, which is a measure of the time it would take to work through the backlog given the current throughput without additional input arriving. Other signals can also be used.

Autotuning seeks an equilibrium among all stages a job with the following constraints: backlog growth, backlog volume, and CPU utilization. A subset of these constraints can be used to make adjustments. For example, in some implementations, backlog growth and backlog volume may be used. A backlog growth constraint is that the backlog growth<=0 on average. If backlog growth is positive, backlog accumulates and the job falls behind. A backlog volume constraint is the backlog volume<=a target backlog volume. For example, when the backlog volume is a backlog time, a relatively short backlog time is desired to avoid an otherwise stable state where backlog isn't growing, but where there exists a large processing latency. Shorter acceptable backlogs achieve lower latency while requiring more processing resources. In some cases, the acceptable backlog latency time is or approaches 0. In other cases, the acceptable backlog latency time is greater. A CPU constraint is the CPU (e.g., data processor 114) utilization being above a threshold. Stable states with low CPU utilization indicate that the streaming job can likely keep up with fewer workers. In some implementations, the backlog constraints are used to determine whether to adjust the number of resources allocated to a job, and the CPU constraint is used to determine the number of resources to adjusted should the system determine to adjust the number of resources.

The overall job sizing depends on the maximum number of workers needed to meet the backlog constraints for all stages. If the backlog constraints are satisfied for all stages, then the CPU constraint is used to determine how far to reduce allocation.

In some implementations, persistent disks are used to store state. A job can have a fixed number, in some cases the same as the maximum number of workers for the job, of persistent disks to store the job state. Each disk corresponds to a key range being processed by the job. As a result, workers with more disks are busier than workers with fewer disks (assuming an even data distribution among ranges). In some cases, scaling the numbers of workers with uneven disk distributions results in performance at the level of the most loaded worker. As a result, autotuning picks numbers of workers that provides a mostly even disk distribution (e.g., if the system target d disks per worker, it minimizes the numbers of workers that have d1 disks).

In some implementations, the desired number of workers for a particular stage is computed by dividing the current input rate (throughput+backlog growth) by the current throughput and scaling that by the current number of workers. For example, if throughput is 1 MB/s and backlog growth is 200K/s with 10 workers, then autotuning would request 1.2*10=12 workers. Additionally, extra workers may be added due to longer than desired backlog time.

In some implementations, each stage independently computes this desired number of workers. The pool for the job is then scaled to the maximum desired number of workers over all stages.

In order to reduce the number of resources allocated to a job, the job can to be in a stable situation where the average backlog time is below some threshold, and the backlog growth is 0 (e.g., on average, over time, within a threshold distance). In some implementations, the system determines how far to reduce allocation as follows. Given the desire for even disk distributions, autotuning uses CPU as a proxy of whether the job can handle the next lower level of workers as follows. Assume the current number of workers w1 have d1 (or d1−1) disks per worker. Find the minimum d2>d1 disks per worker and the minimum w2 workers necessary, such that w2<w1 and each worker gets d2 disks (or d2−1). Assuming perfect scaling and no overheads, the new workers would run at the current CPU rate multiplied by w1/w2. If that new CPU rate is below a reasonable threshold (e.g., below 1.0), then autotuning attempts to reduce allocation to w2.

Signals right after a previous allocation increase or decrease are often not representative of the steady state (e.g. due to frequent cache misses, etc.). As a result, autotuning can use smoothing of decisions to avoid unnecessary oscillation, while still reacting to true changes in workload. Smoothing of upscaling decisions happens by 1) waiting for input signals to stabilize for a period of time after a worker change, and 2) smoothing the output signals to pick the average desired workers over a window of time on upscaling, assuming the minimum requested worker number in the window is higher than the current number. Waiting for the minimum to go up throughout the window avoids reacting to short term noise in input rate. For example, if the current number of workers is less than 10 and the window contains the following desired worker numbers [11, 12, 10], an allocation increase would pick 11 as the number of workers to actuate (before normalizing the number to get an even disk distribution).

For downscaling, in some implementations, autotuning waits until every value in the window over a certain time period is below the current number of workers, then scales down to the maximum (which currently will always be the next lower level of workers with even disk distributions).

The following signals can be related to the workers can be received from a worker manager. Per_stage signals. input_size: ever increasing sum of bytes processed. Derivative computed as throughput, see below. backlog_size: current size in bytes in backlog. Derivative computed as backlog growth, see below. active_size: bytes currently being processed by this stage. Used to determine inherent latency of stage. system_watermark: system watermark for the stage. In some implementations, increase at 1 M/s.

Job signals. active_workers: current number of workers active. In the context of streaming, workers may be worker processes and/or worker threads. In some implementations, computed as the number of workers checking in after receiving a configuration update. The count can reflect the number of workers ready to work (e.g., after all disk assignment, scanning is done). attached_disks: used to determine if not all disks are attached and thus no scaling decisions should be made. average CPU utilization: average CPU utilization of all worker VMs in the job.

Derived signals, e.g., for each stage of a job. throughput (since last update and exponential average) from input_size. backlog_growth (since last update and exponential average) from backlog size. backlog_time: (backlog_size active_size)/throughput. The time it would take to work_through the backlog without additional input arriving (possibly discounting what is currently in flight). In some implementations, as the system approaches real time, efficiency may drop and thus effective backlog time may be longer. min_throughput=throughput+max(0, backlog_growth) the minimum throughput required to not fall behind.

Goals Per Stage is to scale workers in order to reach an equilibrium with the following constraints: backlog_growth<=0 on average, i.e., backlog length stable, not growing. backlog_time<=acceptable_backlog_time (a configuration parameter). backlog_time>=max_backlog_to_downscale (a configuration parameter). The backlog_time constraints attempt to make sure that the latency is within an acceptable range, to avoid being in a stable backlog state, where the backlog is extremely large. The max_backlog_to_downscale constraint is our signal to attempt to reduce allocation. If the system is below that threshold the system is likely wasting resources and could do with fewer system workers.

In some implementations, upscaling is based on adding workers to 1) keep up with the input rate, and 2) reducing the backlog towards the minimum length. In some instances, eventual linear scaling of throughput with the number of workers may be assumed, that is, as the number of workers increases or decreased by a factor of x, the throughput increases or decreases by a factor of x. In some implementations, it may be calculated that the number of workers needed is the minimum level of throughput needed divided by the throughput per worker.

The remaining backlog is the backlog above acceptable backlog that the system does not appear to be reducing by the current backlog growth when the growth is negative. This can be calculated as the backlog active size, minus the acceptable size of the backlog, plus the sum of the negative backlog growth and backlog recovery time.

An additional number of workers are picked to get through the remaining backlog within the backlog recovery time based on the current throughput per worker. The number of additional workers can be calculated as the remaining backlog divided by the sum of the throughput per worker and backlog recovery time. The new desired number of workers is then calculated as the number of throughput workers plus the number of backlog workers.

Because the total number of disks may be fixed per job, when the system scales, the system can distribute the existing disks among the workers. A disk corresponds to sources/ranges of data and as a result, workers with more disks are busier than workers with fewer system disks (assuming an even data distribution among ranges). In some cases, scaling to numbers of workers with uneven disk distributions results in performance at the level of the most loaded worker. As a result, the system can attempt to scale to the nearest number of workers that provides an even disk distribution.

In order to reduce allocation, the system may, in some implementations, be required to be in a stable situation where the average backlog time is below max_backlog_to_downscale, and the backlog growth is 0 on average. To determine how far to reduce allocation, the system uses CPU as a proxy of whether the system can handle the next lower level of workers. One example proxy-based determination may be as follows. Assume the current number of workers w1 implies a max # disks per worker of d1. The system computes the max workers w2<w1 such that each worker has at most d2>d1 disks. In some situations, the new workers would run at the current CPU rate multiplied by w1/w2. If that new CPU is below an acceptable maximum (e.g., below 1.0), then the system attempt to reduce allocation to w2.

For job scaling, each stage independently may have a desired number of workers. The pool for the job is then scaled to the maximum desired number of workers over all stages.

Smoothing can happen by 1) waiting for input signals to stabilize for a period of time after a worker change, and 2) smoothing the output signals to pick the average desired workers over a window on upscaling, assuming the minimum is higher than the current number. Waiting for the minimum to go up throughout the window can avoid reacting to short term spikes in min_throughput.

For downscaling, the system can, in some implementations, wait until every value in the window is below the current number of workers, then scale down to the maximum identified (which currently will always be the next to the system level of workers with even disk distributions).

Figure 3:
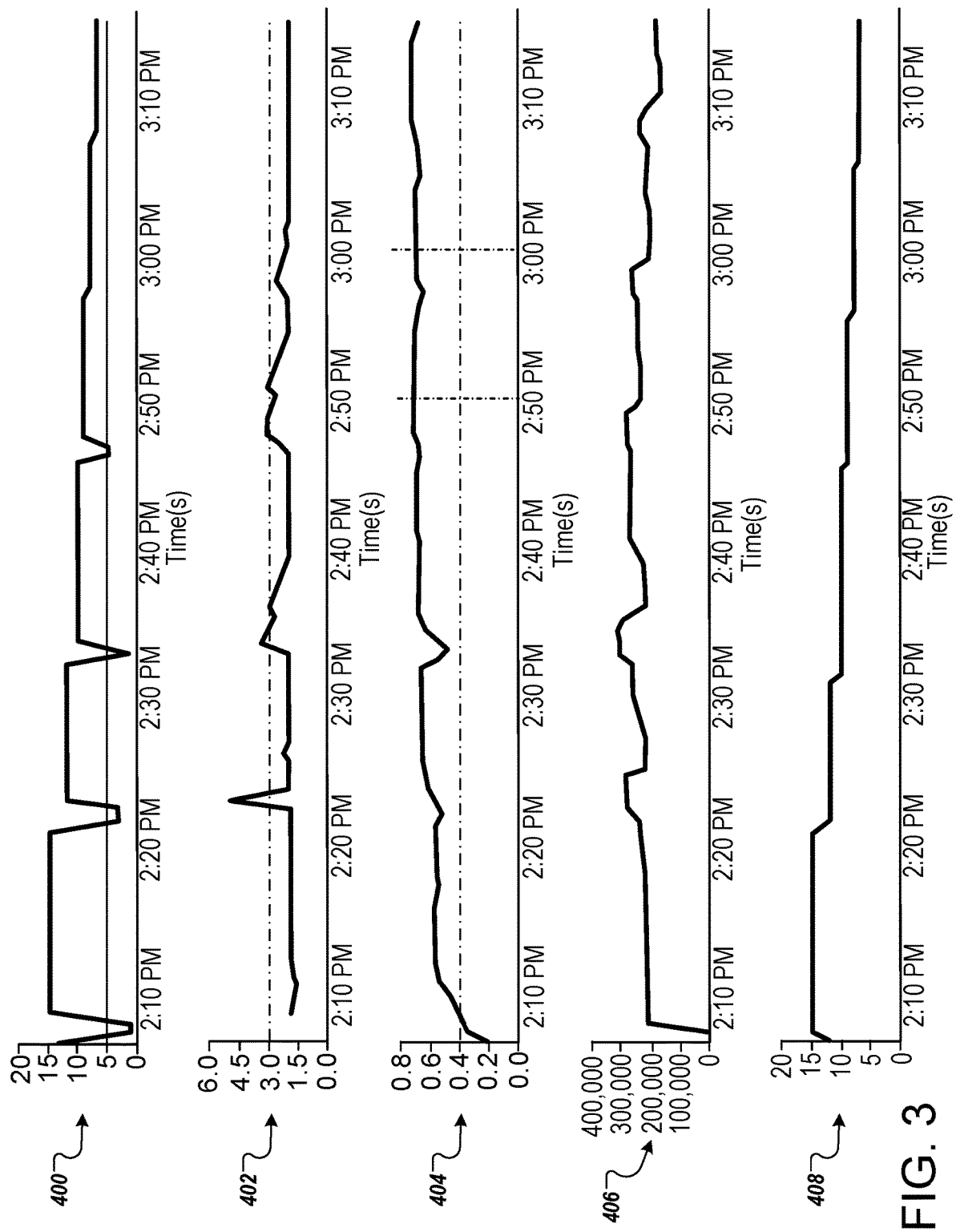
FIG. 3 contains charts showing streaming signals over time.

FIG. 3 contains charts 400, 402, 406, and 408 showing streaming signals over time. Chart 400 shows the number of active workers. In this series, the workers progressively reduce allocation from 15 to 8 as can be seen in the bottom series where requested workers are shown. The discrepancy between requested and active workers shows that some workers might not be active for brief periods during resizing, they might fail and come back, etc. Note that active and requested worker series are the same for each stage as all workers work on all stages at the moment.

Chart 402 shows the backlog time for this stage. It is the estimated time it would take to reduce the backlog to 0 given the current average processing speed.

Chart 404 show streaming CPU utilization. Shown here is an average utilization over all virtual machines. However, other metrics may be used, including an average excluding outliers, medians, modes, minimums, maximums, or metrics that combine values such as these.

Chart 406 shows the input rate started at about 5 MB/s and increased to 6.6 MB/s and then started to decrease to below 4 MB/s. The bumps in the rate are due to the resizing points shown as decreases in chart 408. Resizing causes pipeline stalls, which in turn causes backups and then catchup work. These transients thus show up in the derived signals.

Figure 4:
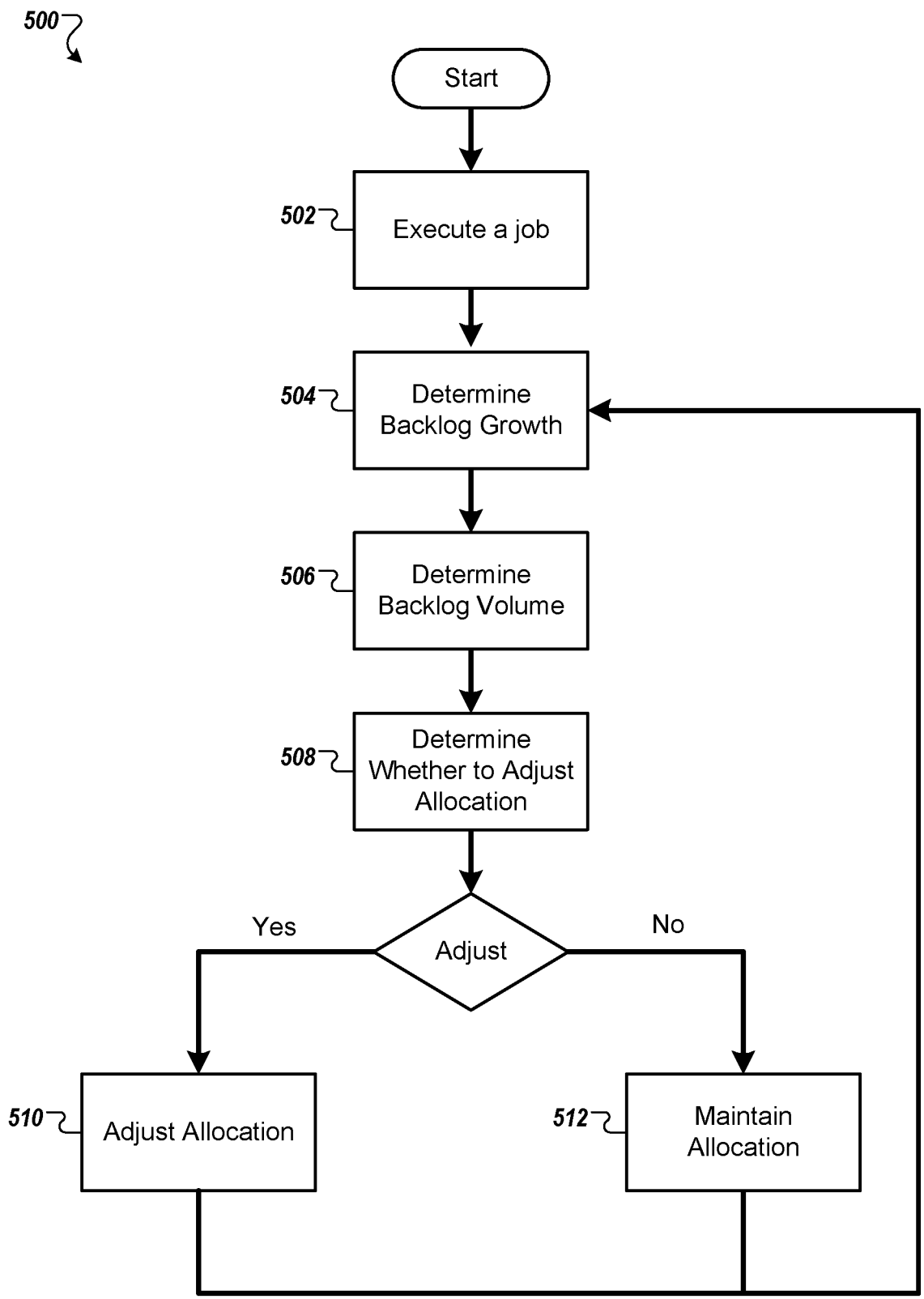
FIG. 4 is a flowchart of an example process for autotuning resource allocation.

FIG. 4 is a flowchart of an example process 500 for autotuning resource allocation. The process 500 may be performed by, for example, elements of the highly distributed computing environment 100. Therefore, by way of example, the process 500 will be described with reference to the highly distributed computing environment 100. However, other elements may be used to perform the process 500 or other similar processes.

The process 500 includes executing 502, in a computer system that comprises multiple processing resources, a job that receives as input a data stream, wherein the amount of data in the data stream is unbounded. For example, the distributed processing system manager 110 may receive a job from an external user. This job may include, for example, instructions for one or more sources of input from the streaming data provider 106 to be used as input data. The highly distributed computing environment 100 may execute the job by assigning, or instructing the worker manager 112 to assign, data processors 114 and/or disks of the network storage devices 108 to one or more workers 113, and by assigning those one or more workers 113 to the job. This initial allocation to the jobs may be set based on any technologically appropriate factors, including but not limited to past executions of the jobs 111, available system resources, or other factors.

The process 500 includes iteratively determining, for the job, a backlog growth 504, backlog volume 506, and whether to adjust allocation 508.

Iteratively determining, for the job, a backlog growth 504, includes determining a backlog growth over a first period of time, wherein the backlog growth is a measure of a growth of unprocessed data in the received data stream that is to be input into the job. For example, as the job 111 executes, it receives input from the streaming data provider 106. This input may be stored in an appropriate storage structure like a queue or buffer until the job 111 is able to accept and process more of the data. This can create or add to backlog growth over time if the job 111 is not able to process the data as fast as it is received. If the job 111 is able to process the data faster that it is received in the storage structure, this can lead to a reduction in backlog growth. In any case, the change or non-change in growth may be monitored. This backlog growth can be measured, for example, in terms of a change to the data size (i.e. bits, bytes, megabytes, gigabytes, records, cardinality), time to process (i.e. microseconds, seconds, minutes, hours, days, MB/s), or otherwise.

Iteratively determining, for the job, a backlog volume 506, includes determining a backlog volume that is a measure of unprocessed data in the received data stream that is to be input into the job. As described, data awaiting processing by the job 111 can be referred to as backlog. This backlog can be measured, for example, in terms of a data size (i.e. bits, bytes, megabytes, gigabytes, records, cardinality), time to process (i.e. microseconds, seconds, minutes, hours, days), or otherwise.

Iteratively determining, for the job whether to adjust allocation 508 includes determining, based on the backlog growth and the backlog volume, whether to adjust a quantity of processing resources allocated to the job. As will be described further in the example process 600 below, the state of the backlog growth and backlog volume may be used as indicators of overprovision or underprovision, and allocation of fewer or more resources may be possible or desired.

For each iteration for which the quantity of processing resources allocated to the job are determined to be adjusted, adjusting 510 the quantity of processing resources allocated to the job. For example, if the network resources are overprovided to the job 111, they may be reduced. And if the network resources are underprovisioned, they may be increased.

For each iteration for which the quantity of processing resources allocated to the job are determined not to be adjusted, maintaining 512 the quantity of processing resources allocated to the job. For example, if the network resources are neither overprovisioned nor underprovisioned, the same or a similar level of network resources may be provisioned to the job 111. This may include the exact same resources continuing to be provisioned, or it may include different resources provisioned in such a way as to be equivalent.

Other example processes may include a different number, type, and order of elements. For example, in addition to a backlog growth and backlog volume, an average processor utilization may be determined. In this example, iteratively determining whether to adjust a quantity of processing resources allocated to the job is further based on the processor utilization. If the processor utilization e.g., average across virtual machines used is below a value, the system can determine that the quantity of processing resources allocated to the job are to be adjusted. For example, if the processor utilization is below a value, the system can determine that the quantity of processing resources allocated to the job are determined to be adjusted in response to the processor value being determined to be below a value. The system can then adjust the quantity of processing resources allocated to the job comprises reducing the quantity of processing resources allocated to the job in response to the processor value being determined to be below a value. For example, if many workers have processors with low processor utilization, this may be interpreted as a sign of overprovisining, and the system can autotune the allocated resources by reducing the allocated resources.

Figure 5:
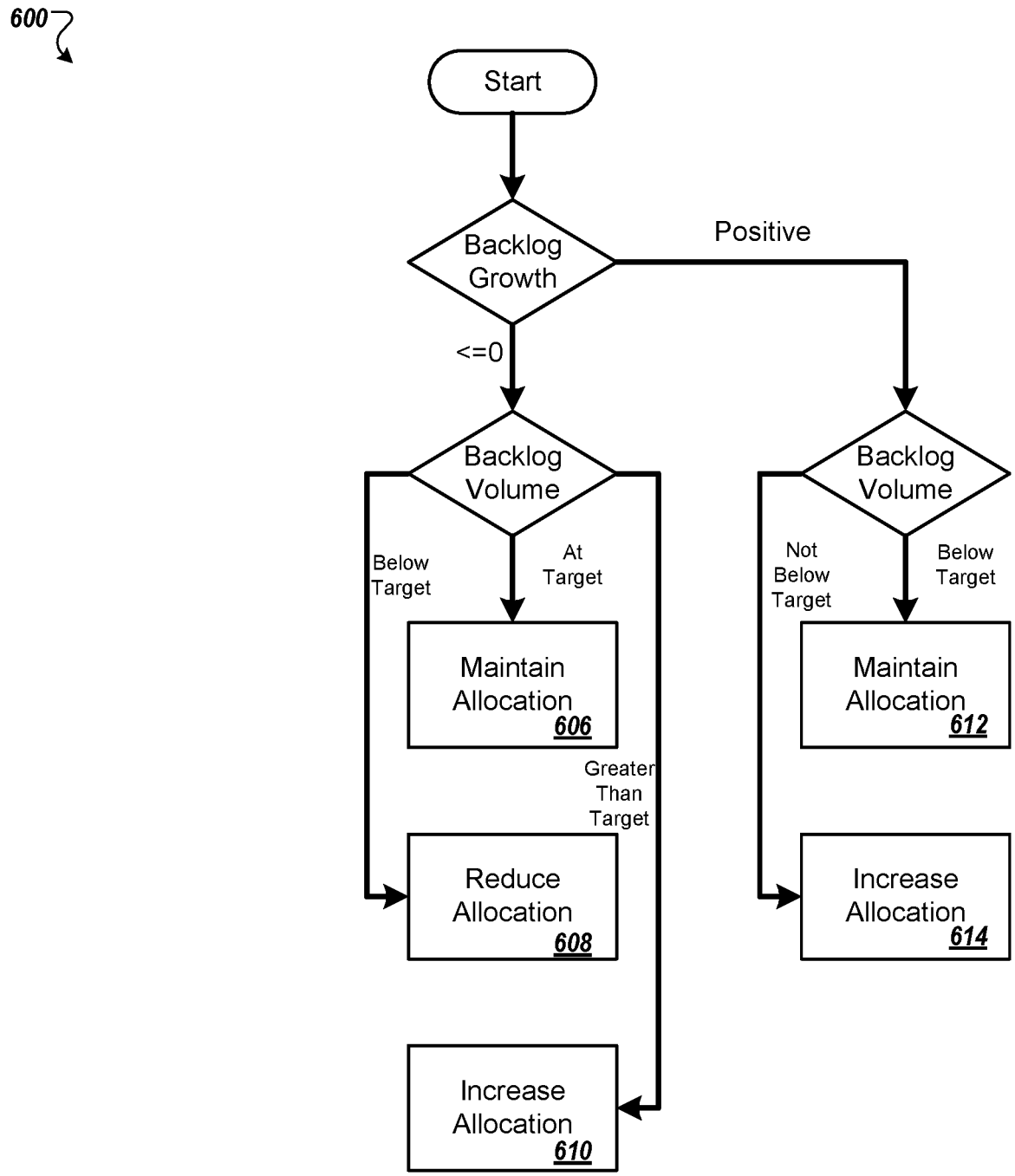
FIG. 5 is a flowchart of an example process for determining if resource allocation should increase or decrease.

FIG. 5 is a flowchart of an example process 600 for determining if resource allocation should increase or decrease. The process 600 may be performed by, for example, elements of the highly distributed computing environment 100. The process 600 may be performed, for example, as a part of performing the process 500. However, other elements may be used to perform the process 600 or other similar processes, as part of the process 500 or not as part of the process 500.

The quantity of processing resources allocated to the job can be maintained 606. For example, if the backlog growth is determined to be negative or zero (e.g., zero, within a threshold value of zero) and the backlog volume is determined at a target value (e.g., identical to a target, within a threshold value of a target), this may indicate that the allocated resources are sufficient to allow the job to process the input data without being overprovisioned.

The quantity of processing resources allocated to the job can be reduced 608. For example, if the backlog growth is determined to be negative or zero and the backlog volume is below a target, the backlog may be permitted to grow—perhaps until the backlog approaches or reaches the target.

The quantity of processing resources allocated to the job can be increased 610. For example, if the backlog growth is determined to be zero and the backlog volume is at a target, additional resources may be allocated to reduce the backlog—perhaps until the backlog approaches or reaches the target.

The quantity of processing resources allocated to the job can be maintained 612. For example, if the backlog growth is determined to be positive and the backlog volume is determined to be below a target, the backlog may be permitted to grow—perhaps until the backlog approaches or reaches the target.

The quantity of processing resources allocated to the job can be increased 614. For example, if the backlog growth is determined to be positive and the backlog volume is not below the target, additional resources may be allocated to the job so that the backlog growth can be halted or reversed.

Other example processes may include a different number, type, and order of elements.

Figure 6C:
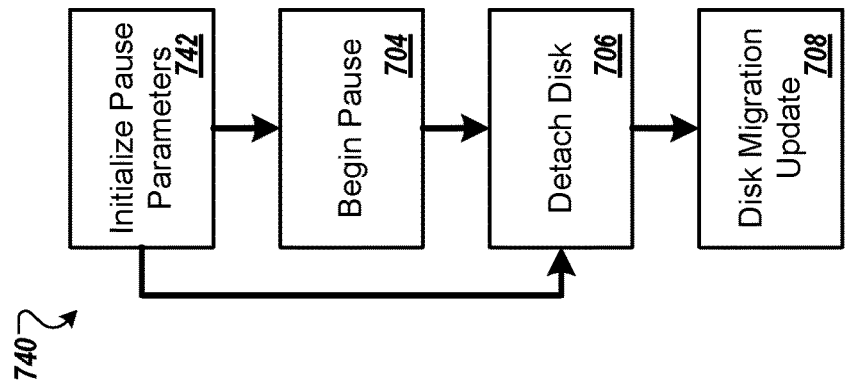
FIGS. 6A, 6B, and 6C are flowcharts of example processes for setup, resize, and pausing of tasks.
Figure 6B:
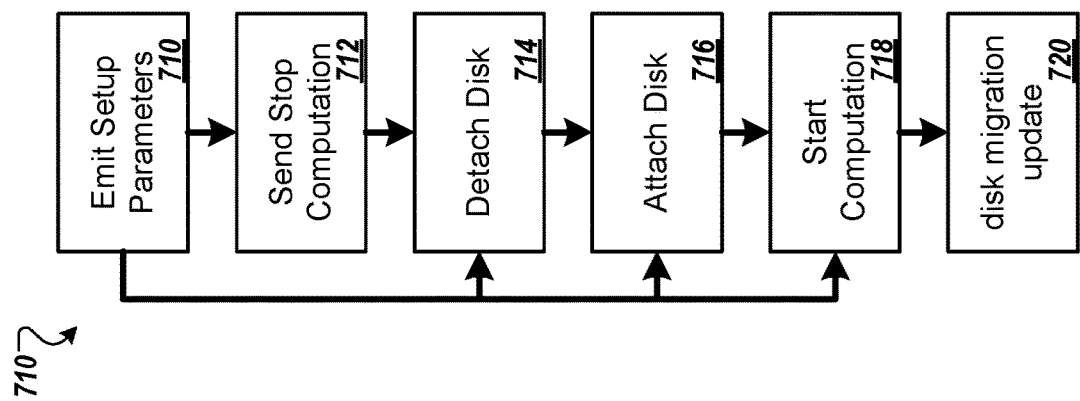
Figure 6A:
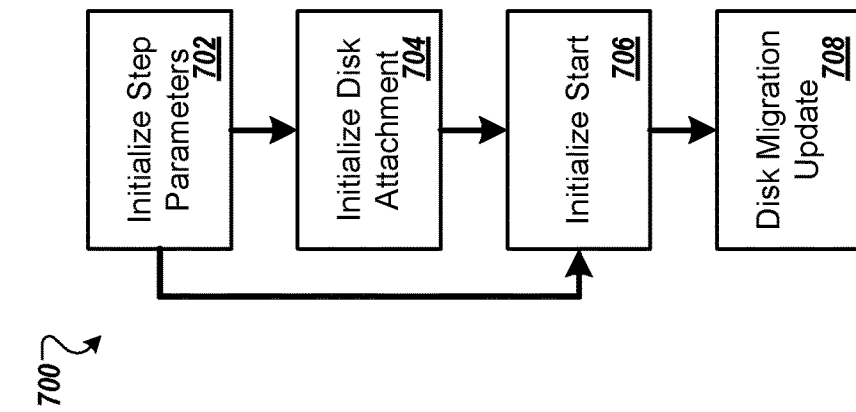

FIGS. 6A, 6B, and 6C are flowcharts of example processes for setup, resize, and pausing of tasks.

During initial startup 700 a streaming load balancer can be responsible for telling workers which ranges they own, which disks to mount, as well as coordinating to attach the data disks to the correct workers. During resizing, the load balancer can tell workers to stop working on a particular range, unmount the corresponding disks, detach the disks, reattach the disks, create new topology setup tasks for all workers, and create new start computation tasks.

The streaming load balancer interacts with workers using small step execution instances. These are triggered when the streaming load balancer requires interaction with workers. These steps can end in generating special disk migration update results that the streaming load balancer consumes in order to know that the steps it launched have finished. After the streaming load balancer receives the disk migration update, it can issue new setup (topology) tasks to all workers with the new disk assignment.

Initial startup 702. The streaming load balancer initially sends each worker a task setup message containing the topology and disk assignments. The initial setup task can contain disks for each worker, however the system may decide to not send the disk assignments on the initial setup task. This can prevent workers from trying to mount disks they don't yet have attached. Workers can claim this setup task and because it can be their first, they can try to mount the disks but no disks appear in the setup tasks, which can cause errors in the system.

The streaming load balancer can then start a disk attachment 704. The first step can perform disk attachments to all workers given the topology in the step input. Once, e.g., all disks are attached, a subsequent computation start can trigger that generates streaming computation tasks for all workers to tell them what disk to attach. The step can wait until all these tasks have entered a done state. Workers can claim these computation tasks and try to mount the disks and start asking for the associated ranges. At that point, workers can start 706 work.

When the system detects that all streaming computation tasks have completed, a disk migration update 708 can begin to tell the streaming load balancer that everything is done. The streaming load balancer observes the DiskMigrationUpdate and cancels all existing setup tasks and can emit new setup tasks to all workers that contain the final disk assignment.

Workers on their next update of the task setup message lease (1 s) can drop the setup task and look for a new one. The workers don't necessarily act upon the disks in the new setup tasks though as it is not their first one, assuming that they already have the correct disks mounted.

Resizing (e.g., moving disks) 710. There can be at least 2 cases, upsizing and downsizing. They may both be handled with the same or similar steps in a protocol, an example of which are as follows: Emit 712 new empty setup tasks for new workers (none on downsize). These contain no disks initially. Wait on new workers to claim these empty setup tasks (in order to not stop existing streaming too early). No waiting may be necessary on downsize. Send a stop computation tasks 712 to all workers losing disks and wait for them all to be done. Perform a disk detach 714 step. Perform a disk attach 716 step. Send start computation 718 tasks to all workers gaining disks and wait for them all to be done. Cancel all existing setup tasks and emit new final setup 720 tasks to all workers. The orchestration between the streaming load balancer and the mini workflow steps above can be done the same way as during initial setup, i.e., after the last step can be complete, disk migration update results may be generated that the streaming load balancer consumes before it emits the final new setup tasks.

Pause 740. To pause a workflow, pause parameters may be initialized 742. The pause in computations by the workers can begin 704. Disks may be detached from some or all workers 706. A disk migration update 708 may be completed.

Although the processes 700, 710, and 740 are described with a particular number, order, and types of operations, others are possible. For example, another process is described below. In this process the system can emit new setup tasks at the same time the system emits start and stop computation tasks, thereby making the workers behavior idempotent with respect to failures. In each disk migration, there may be at least 3 kinds of workers: Workers losing disks. Workers gaining disks. Workers keeping the same disks. For testing, the system also supports the fourth combination, workers gaining and losing disks.

Workers losing any disks can get their tasks and need to get new setup tasks at the same time that no longer contains the disks that they are losing. In addition, if the worker can gain a disk on the next task, the setup task emitted at this point may not include the disks it does not already have. Thus, if they crash, they may not necessarily try to mount the disks they are/have just given up and they may not necessarily try to mount disks they haven't received yet. If they unmounted their disk successfully, then they can reach the desired state. Otherwise, they can reclaim and execute the unmount again which can be a noop if it has already been done. If they crash and restart, they only mount disks they keep in this round (neither lose nor gain).

Workers gaining a disk can get a new setup task at the same time they get a start computation task. If they crash, they can mount the new disks on restart, whether they have/have not completed the start computation task. Again, in case they already have mounted some disks, the remounting can be idempotent and may not cause a problem. Workers keeping the same disks can be given new setup tasks at any time during the migration. The system can create new setup tasks for these workers at a stop computation point, i.e., the first point where some workers have to stop working using the existing topology.

Initial Start. On initial start, the system no longer emits the initial setup tasks, instead, the system attaches disks, then emit all final setup tasks as part of the start computation step. This fixes the race and improves startup time as no setup tasks need to be abandoned, reclaimed.

Resize (migration). When upsizing, the system should wait for the new virtual machines to be ready before migrating disks away from productive workers. Thus, the system still emits the initial setup tasks for new workers, with the flag set (they actually contain no disks at that point because there are no unassigned disks). New workers can initially get an empty setup task, but this permits waiting until they are ready.

After that, the stop computation tasks are emitted for existing workers that lose a disk, along with their new setup tasks (and cancellation of existing setup tasks). At the same time, the system can also emit all setup tasks for workers that neither gain nor lose a disk. Once all stop computation tasks have completed, disks are detached and then attached. Finally, the new start computation tasks are emitted, along with new setup tasks (and cancellation of existing setup tasks) for workers gaining disks.

New workers can then either see their new setup task with the final disk assignment, or the start computation task first. Either can cause them to mount the disks they have at that point. If they crash around that time they can also reach the new target state.

Pause. When pausing, the system emits stop computation tasks, along with cancellation of existing setup tasks and new setup tasks that contain no disk assignment (so in case of crashes, workers don't try to mount disks they may have given up) to all virtual machines. The disks are detached.

It may be useful to compute a map from worker to their setup task. Because this map gets modified during Stop and Start computation steps, which have their own nested transaction, we cannot maintain this map consistently as was previously done in the streaming load balancer. Instead, we use a result cache in these steps to compute the map on demand. This also provides the opportunity to delete old invocation results for all the aborted and done tasks.

This map can be computed and consulted whenever we emit a new Setup task to cancel the existing one for this worker (if it exists). This happens either on stop computation or start computation steps, as well as after downsizing or pause.

In addition, communication of job processes may be communicated to users using some, but not all, of the information available to the system. Below are some example details that may be used.

FIG. 7 shows an example of a computing device 800 and a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provided as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method for allocating resources in a computer system, the method comprising:
   executing a job that receives as input a data stream;
   determining whether a backlog volume of data that is to be processed by the computer system is greater than, less than, or equal to a predetermined threshold;
   determining whether backlog growth of the data that is to be processed is positive, negative, or zero;
   based on determining that the backlog volume of data is greater than or equal to the predetermined threshold and determining that the backlog growth is positive-, adjusting a quantity of processing resources allocated to the job, wherein adjusting the quantity of processing resources allocated to the job comprises increasing the quantity of processing resources allocated to the job; and
   maintaining the quantity of processing resources allocated to the job when the backlog volume of data that is to be processed by the computer system is below the predetermined threshold and the backlog growth is determined to be positive; and
   executing the job using the quantity of processing resources allocated to the job.

2. The method of claim 1, wherein the backlog volume of data is a measure of unprocessed data in the received data stream that is to be input into the job.

3. The method of claim 1, wherein the backlog volume is measured in terms of a data size.

4. The method of claim 1, wherein resources include processor resources or storage resources.

5. The method of claim 1, the method comprising:
after the adjusting of the quantity of processing resources:
determining that the quantity of processing resources allocated to the job are to be adjusted to a level of resources used by the computer system prior to the increase in the quantity of processing resources.

6. A system comprising:
one or more computers and one or more storage devices storing instructions that are operable, when executed by the one or more computers, to cause the one or more computers to perform operations comprising:
executing a job that receives as input a data stream;
determining whether a backlog volume of data that is to be processed by the computer system is greater than, less than, or equal to a predetermined threshold;
determining whether backlog growth of the data that is to be processed is positive, negative, or zero;
based on determining that the backlog volume of data is greater than or equal to the predetermined threshold and determining that the backlog growth is positive, adjusting a quantity of resources allocated to the job, wherein adjusting the quantity of resources allocated to the job comprises increasing the quantity of resources allocated to the job in response to the backlog volume being determined to be greater than or equal to the predetermined threshold;
maintaining the quantity of resources allocated to the job when the backlog volume of data that is to be processed by the computer system is below the predetermined threshold and the backlog growth is determined to be positive; and
executing the job using the quantity of processing resources allocate to the job.

7. The system of claim 6, wherein the backlog volume of data is a measure of unprocessed data in the received data stream that is to be input into the job.

8. The system of claim 6, wherein the backlog volume is measured in terms of a data size.

9. The system of claim 6, wherein resources include processor resources or storage resources.

10. The system of claim 6, the operations comprising:
after the adjusting of the quantity of resources:
determining that the quantity of resources allocated to the job are to be adjusted to a level of resources used by the computer system prior to the increase in the quantity of resources.

11. A non-transitory computer-readable storage device having stored thereon instructions, which, when executed by a data processing apparatus, cause the data processing apparatus to perform operations comprising:
executing a job that receives as input a data stream;
determining whether a backlog volume of data that is to be processed by the computer system is greater than or equal to a predetermined threshold;
determining whether backlog growth of the data that is to be processed is positive, negative, or zero;
based on determining that the backlog volume of data is greater than or equal to the predetermined threshold and determining that the backlog growth is positive, adjusting a quantity of resources allocated to the job, wherein adjusting the quantity of resources allocated to the job comprises increasing the quantity of resources allocated to the job;
maintaining the quantity of resources allocated to the job when the backlog volume of data that is to be processed by the computer system is below the predetermined threshold and the backlog growth is determined to be positive; and
executing the job using the quantity of processing sources allocated to the job.

12. The computer-readable medium of claim 11, wherein the backlog volume of data is a measure of unprocessed data in the received data stream that is to be input into the job.

13. The computer-readable medium of claim 11, wherein the backlog volume is measured in terms of a data size.

14. The computer-readable medium of claim 11, wherein resources include processor resources or storage resources.

15. The computer-readable medium of claim 11, the operations comprising:
after the adjusting of the quantity of resources:
determining that the quantity of resources allocated to the job are to be adjusted to a level of resources used by the computer system prior to the increase in the quantity of resources.

* * * * *